(12) United States Patent  
Olson

(10) Patent No.: US 8,685,247 B2  
(45) Date of Patent: Apr. 1, 2014

(54) SYSTEMS AND METHODS FOR NUTRIENT REMOVAL IN BIOLOGICAL TREATMENT SYSTEMS

(75) Inventor: John Edward Olson, Pewaukee, WI (US)

(73) Assignee: Evoqua Water Technologies LLC, Alpharetta, GA (US)

( * ) Notice: Subject to any disclaimer, the term of this patent is extended or adjusted under 35 U.S.C. 154(b) by 518 days.

(21) Appl. No.: 12/958,542

(22) Filed: Dec. 2, 2010

(65) Prior Publication Data

US 2011/0132836 A1 Jun. 9, 2011

Related U.S. Application Data

(60) Provisional application No. 61/266,261, filed on Dec. 3, 2009.

(51) Int. Cl.
*C02F 3/30* (2006.01)

(52) U.S. Cl.
USPC ........... 210/605; 210/614; 210/622; 210/623; 210/903; 210/906; 210/259

(58) Field of Classification Search
USPC ........ 210/603, 605, 614, 621, 622, 623, 630, 210/903, 906, 252, 259
See application file for complete search history.

(56) References Cited

U.S. PATENT DOCUMENTS

| | | |
|---|---|---|
| 2,893,957 A | 7/1959 | Genter et al. |
| 3,047,492 A | 7/1962 | Gambrel |
| 3,192,155 A | 6/1965 | Bready et al. |
| 3,259,566 A | 7/1966 | Torpey |
| 3,544,476 A | 12/1970 | Aiba et al. |
| 3,595,537 A | 7/1971 | Kaelin |
| 3,617,540 A | 11/1971 | Bishop et al. |
| 3,756,946 A | 9/1973 | Levin et al. |
| 3,787,316 A | 1/1974 | Brink et al. |
| 3,907,672 A | 9/1975 | Milne |
| 3,964,998 A | 6/1976 | Barnard |
| 4,042,493 A | 8/1977 | Matsch et al. |
| 4,056,465 A | 11/1977 | Spector |
| 4,132,638 A | 1/1979 | Carlsson |
| 4,141,822 A | 2/1979 | Levin et al. |
| 4,160,724 A | 7/1979 | Laughton |
| 4,162,153 A | 7/1979 | Spector |
| 4,173,531 A | 11/1979 | Matsch et al. |
| 4,180,459 A | 12/1979 | Zievers |

(Continued)

FOREIGN PATENT DOCUMENTS

| | | |
|---|---|---|
| DE | 4238708 | 5/1994 |
| DE | 4444335 | 6/1996 |

(Continued)

OTHER PUBLICATIONS

Ng, How, et al., "Membrane bioreactor operation at short solids retention times: performance and biomass characteristics," Water Research 39 (2005), pp. 981-992.

(Continued)

*Primary Examiner* — Fred Prince

(57) ABSTRACT

The present invention relates to systems and processes of wastewater treatment and, in particular, to systems and methods of treating wastewater utilizing biological treatments utilizing two mixed liquor recycle streams for nutrient removal.

27 Claims, 1 Drawing Sheet

(56) References Cited

U.S. PATENT DOCUMENTS

| | | | |
|---|---|---|---|
| 4,271,026 | A | 6/1981 | Chen et al. |
| 4,277,342 | A | 7/1981 | Hayes et al. |
| 4,279,753 | A | 7/1981 | Nielson et al. |
| 4,284,510 | A | 8/1981 | Savard et al. |
| 4,323,367 | A | 4/1982 | Ghosh |
| 4,351,729 | A | 9/1982 | Witt |
| 4,370,233 | A | 1/1983 | Hayes et al. |
| 4,374,730 | A | 2/1983 | Braha et al. |
| 4,407,717 | A | 10/1983 | Teletzke et al. |
| 4,491,522 | A | 1/1985 | Ishida et al. |
| 4,522,722 | A | 6/1985 | Nicholas |
| 4,537,682 | A | 8/1985 | Wong-Chong |
| 4,548,715 | A | 10/1985 | Stein |
| 4,568,457 | A | 2/1986 | Sullivan |
| 4,568,462 | A | 2/1986 | Bohnke et al. |
| 4,599,167 | A | 7/1986 | Benjes et al. |
| 4,632,758 | A | 12/1986 | Whittle |
| 4,643,830 | A | 2/1987 | Reid |
| 4,664,804 | A | 5/1987 | Morper et al. |
| RE32,429 | E | 6/1987 | Spector |
| 4,675,114 | A | 6/1987 | Zagyvai et al. |
| 4,705,633 | A | 11/1987 | Bogusch |
| 4,710,301 | A | 12/1987 | Geuens |
| 4,731,185 | A | 3/1988 | Chen et al. |
| 4,780,198 | A | 10/1988 | Crawford et al. |
| 4,790,939 | A | 12/1988 | Suzuki et al. |
| 4,797,212 | A | 1/1989 | Von Nordenskjold |
| 4,818,391 | A | 4/1989 | Love |
| 4,842,732 | A | 6/1989 | Tharp |
| 4,849,108 | A | 7/1989 | De Wilde et al. |
| 4,867,883 | A | 9/1989 | Daigger et al. |
| 4,874,519 | A | 10/1989 | Williamson |
| 4,891,136 | A | 1/1990 | Voyt |
| 4,915,840 | A | 4/1990 | Rozich |
| 4,956,094 | A | 9/1990 | Levin et al. |
| 4,961,854 | A | 10/1990 | Wittmann et al. |
| 4,975,197 | A | 12/1990 | Wittmann et al. |
| 4,999,111 | A | 3/1991 | Williamson |
| 5,013,442 | A | 5/1991 | Davis et al. |
| 5,019,266 | A | 5/1991 | Soeder et al. |
| 5,022,993 | A | 6/1991 | Williamson |
| 5,051,191 | A | 9/1991 | Rasmussen et al. |
| 5,094,752 | A | 3/1992 | Davis et al. |
| 5,098,567 | A | 3/1992 | Nishiguchi |
| 5,098,572 | A | 3/1992 | Faup et al. |
| 5,114,587 | A | 5/1992 | Hagerstedt |
| 5,126,049 | A | 6/1992 | Hallberg |
| 5,128,040 | A | 7/1992 | Molof et al. |
| 5,137,636 | A | 8/1992 | Bundgaard |
| 5,151,187 | A | 9/1992 | Behmann |
| 5,182,021 | A | 1/1993 | Spector |
| 5,213,681 | A * | 5/1993 | Kos ............... 210/605 |
| 5,234,595 | A | 8/1993 | DiGregorio et al. |
| 5,246,585 | A | 9/1993 | Meiring |
| 5,254,253 | A | 10/1993 | Behmann |
| 5,288,405 | A | 2/1994 | Lamb, III |
| 5,288,406 | A | 2/1994 | Stein |
| 5,304,308 | A | 4/1994 | Tsumura et al. |
| 5,316,682 | A | 5/1994 | Keyser et al. |
| 5,336,290 | A | 8/1994 | Jermstad |
| 5,342,522 | A | 8/1994 | Marsman et al. |
| 5,348,653 | A | 9/1994 | Rovel |
| 5,348,655 | A | 9/1994 | Simas et al. |
| 5,356,537 | A | 10/1994 | Thurmond et al. |
| 5,376,242 | A | 12/1994 | Hayakawa |
| 5,380,438 | A | 1/1995 | Nungesser |
| 5,389,258 | A | 2/1995 | Smis et al. |
| 5,480,548 | A | 1/1996 | Daigger et al. |
| 5,482,630 | A | 1/1996 | Lee et al. |
| 5,505,862 | A | 4/1996 | Sonnenrein |
| 5,514,277 | A | 5/1996 | Khudenko |
| 5,514,278 | A | 5/1996 | Khudenko |
| 5,531,896 | A | 7/1996 | Tambo et al. |
| 5,543,051 | A | 8/1996 | Harris |
| 5,543,063 | A | 8/1996 | Walker et al. |
| 5,582,734 | A | 12/1996 | Coleman et al. |
| 5,601,719 | A | 2/1997 | Hawkins et al. |
| 5,611,927 | A | 3/1997 | Schmid |
| 5,624,562 | A | 4/1997 | Scroggins |
| 5,624,565 | A | 4/1997 | Lefevre et al. |
| 5,626,755 | A | 5/1997 | Keyser et al. |
| 5,650,069 | A | 7/1997 | Hong et al. |
| 5,651,891 | A | 7/1997 | Molof et al. |
| 5,658,458 | A | 8/1997 | Keyser et al. |
| 5,725,772 | A | 3/1998 | Shirodkar |
| 5,733,455 | A | 3/1998 | Molof et al. |
| 5,733,456 | A | 3/1998 | Okey et al. |
| 5,746,919 | A | 5/1998 | Dague et al. |
| 5,750,041 | A | 5/1998 | Hirane |
| 5,773,526 | A | 6/1998 | Van Dijk et al. |
| 5,811,008 | A | 9/1998 | Von Nordenskjold |
| 5,824,222 | A | 10/1998 | Keyser et al. |
| 5,833,856 | A | 11/1998 | Liu et al. |
| 5,846,424 | A | 12/1998 | Khudenko |
| 5,853,588 | A | 12/1998 | Molof et al. |
| 5,858,222 | A | 1/1999 | Shibata et al. |
| 5,919,367 | A | 7/1999 | Khudenko |
| 5,989,428 | A | 11/1999 | Goronszy |
| 5,993,503 | A | 11/1999 | Kruidhof |
| 6,004,463 | A | 12/1999 | Swett |
| 6,015,496 | A | 1/2000 | Khudenko |
| 6,036,862 | A | 3/2000 | Stover |
| 6,039,874 | A | 3/2000 | Teran et al. |
| 6,047,768 | A | 4/2000 | Buehler, III |
| 6,054,044 | A | 4/2000 | Hoffland et al. |
| 6,066,256 | A | 5/2000 | Henry et al. |
| 6,077,430 | A | 6/2000 | Chudoba et al. |
| 6,093,322 | A | 7/2000 | Bongards |
| 6,110,389 | A | 8/2000 | Horowitz |
| 6,113,788 | A | 9/2000 | Molof et al. |
| 6,117,323 | A | 9/2000 | Haggerty |
| 6,193,889 | B1 | 2/2001 | Teran et al. |
| 6,217,768 | B1 | 4/2001 | Hansen et al. |
| 6,352,643 | B1 | 3/2002 | Kwon et al. |
| 6,383,387 | B2 | 5/2002 | Hasegawa et al. |
| 6,383,389 | B1 | 5/2002 | Pilgram et al. |
| 6,416,668 | B1 | 7/2002 | Al-Samadi |
| 6,423,229 | B1 | 7/2002 | Mao |
| 6,454,949 | B1 | 9/2002 | Sesay et al. |
| 6,527,956 | B1 | 3/2003 | Lefevre et al. |
| 6,555,002 | B2 | 4/2003 | Garcia et al. |
| 6,562,237 | B1 | 5/2003 | Olaopa |
| 6,585,895 | B2 | 7/2003 | Smith et al. |
| 6,592,762 | B2 | 7/2003 | Smith |
| 6,605,220 | B2 | 8/2003 | Garcia et al. |
| 6,630,067 | B2 | 10/2003 | Shieh et al. |
| 6,660,163 | B2 | 12/2003 | Miklos |
| 6,666,965 | B1 | 12/2003 | Timmons |
| 6,706,185 | B2 | 3/2004 | Goel et al. |
| 6,712,970 | B1 | 3/2004 | Trivedi |
| 6,783,679 | B1 | 8/2004 | Rozich |
| 6,787,035 | B2 | 9/2004 | Wang |
| 6,805,806 | B2 | 10/2004 | Arnaud |
| 6,814,868 | B2 | 11/2004 | Phagoo et al. |
| 6,833,074 | B2 | 12/2004 | Miklos |
| 6,863,818 | B2 | 3/2005 | Daigger et al. |
| 6,884,355 | B2 | 4/2005 | Kamiya et al. |
| 6,893,567 | B1 | 5/2005 | Vanotti et al. |
| 7,105,091 | B2 | 9/2006 | Miklos |
| 7,147,778 | B1 | 12/2006 | DiMassimo et al. |
| 7,208,090 | B2 | 4/2007 | Applegate et al. |
| 7,258,791 | B2 | 8/2007 | Matsumoto |
| 7,309,427 | B2 | 12/2007 | Kruse et al. |
| 7,314,564 | B2 | 1/2008 | Kruse et al. |
| 7,413,654 | B2 | 8/2008 | Applegate et al. |
| 7,473,364 | B2 | 1/2009 | Abu-Orf |
| 7,569,147 | B2 | 8/2009 | Curtis et al. |
| 2001/0045390 | A1 | 11/2001 | Kim et al. |
| 2002/0030003 | A1 | 3/2002 | O'Leary et al. |
| 2002/0050283 | A1 | 5/2002 | Bergmann |
| 2002/0185434 | A1 | 12/2002 | Mao |
| 2004/0004038 | A1 | 1/2004 | Yamaguchi et al. |
| 2004/0016698 | A1 | 1/2004 | Unger |
| 2004/0079692 | A1* | 4/2004 | Cote et al. ............... 210/220 |

(56) References Cited

U.S. PATENT DOCUMENTS

| | | |
|---|---|---|
| 2004/0206699 A1 | 10/2004 | Ho et al. |
| 2004/0232076 A1 | 11/2004 | Zha et al. |
| 2005/0040103 A1 | 2/2005 | Abu-Orf et al. |
| 2005/0045557 A1 | 3/2005 | Daigger et al. |
| 2005/0061737 A1 | 3/2005 | Linden et al. |
| 2005/0194310 A1 | 9/2005 | Yamamoto et al. |
| 2006/0113243 A1 | 6/2006 | Applegate et al. |
| 2006/0124543 A1 | 6/2006 | Pehrson et al. |
| 2006/0249448 A1 | 11/2006 | Fujishima et al. |
| 2006/0249449 A1 | 11/2006 | Nakhla et al. |
| 2007/0000836 A1 | 1/2007 | Elefritz et al. |
| 2007/0045181 A1 | 3/2007 | Brase |
| 2007/0051677 A1 | 3/2007 | Curtis et al. |
| 2007/0193949 A1 | 8/2007 | You et al. |
| 2007/0235386 A1* | 10/2007 | Barnes ................... 210/605 |
| 2008/0041783 A1 | 2/2008 | Barnes |
| 2008/0223783 A1 | 9/2008 | Sutton |
| 2009/0014387 A1 | 1/2009 | Probst |
| 2009/0078646 A1 | 3/2009 | Curtis et al. |
| 2011/0089105 A1 | 4/2011 | Liu et al. |

FOREIGN PATENT DOCUMENTS

| | | |
|---|---|---|
| EP | 0106043 | 4/1984 |
| EP | 0408878 | 1/1991 |
| EP | 0440996 | 8/1991 |
| EP | 0497114 | 8/1992 |
| EP | 1236686 | 9/2002 |
| FR | 2674844 | 10/1992 |
| FR | 2766813 B1 | 10/1999 |
| FR | 2843106 B1 | 10/2004 |
| GB | 1438697 A | 6/1976 |
| GB | 1441241 A | 6/1976 |
| GB | 2006743 | 5/1979 |
| JP | 59032999 | 2/1984 |
| JP | 59052597 | 3/1984 |
| JP | 60-84199 | 5/1985 |
| JP | 61192389 | 8/1986 |
| JP | 63130197 | 6/1988 |
| JP | 62138986 | 12/1988 |
| JP | 63302996 | 12/1988 |
| JP | 01174949 | 2/1991 |
| JP | 3042019 | 2/1991 |
| JP | 6091285 | 4/1994 |
| JP | 07-16589 | 1/1995 |
| JP | H71995-16589 | 1/1995 |
| JP | 2000-199086 | 7/2000 |
| JP | 2000210542 | 8/2000 |
| JP | 2001347296 A | 12/2001 |
| JP | 2003033780 A | 2/2003 |
| NL | 9301791 | 10/1993 |
| RU | 1596752 | 9/1995 |
| WO | 9315026 | 8/1993 |
| WO | 9424055 | 10/1994 |
| WO | 9801397 A1 | 1/1998 |
| WO | 03039712 | 5/2003 |
| WO | 03041837 | 5/2003 |
| WO | 03072512 | 9/2003 |
| WO | 2004076026 | 9/2004 |
| WO | 2009086584 | 7/2009 |
| WO | 2009120384 | 10/2009 |

OTHER PUBLICATIONS

Abu-Orf et al., "Chemical and Physical Pretreatment of ATAD Biosolids for Dewatering," Water Science Technology, 2001, vol. 44, No. 10, pp. 309-314, IWA Publishing.

Abu-Orf et al., "Adjusting Floc Cations to Improve Effluent Quality: The Case of Aluminum Addition at Sioux City Wastewater Treatment Facility," Water Environment Federation, 2004, 16 pages.

Bakker, Chapter IIA, "Cell K+ and K+ Transport Systems in Prokaryotes," In Alkali Cation Transport Systems in Prokaryotes, Bakker, E.P., 1993, pp. 205-224, CRC Press.

Bishop et al., "Fate of Nutrients during Aerobic Digestion," Journal Environ. Eng. Div. Proc. Am. Soc. Civil Eng., 1978, vol. 104, No. EE5, pp. 967-979.

Bruus et al., "On the Stability of Activated Sludge Flocs with Implications to Dewatering," Water Research, 1992, vol. 26, No. 12, pp. 1597-1604, Pergamon Press Ltd.

Caulet et al., "Modulated Aeration Management by Combined ORP and DO Control: A Guarantee of Quality and Power Savings for Carbon and Nitrogen Removal in Full Scale Wastewater Treatment Plants," Center of International Research for Water Environment, France, 1999.

Chudoba et al., "Pre-Denitrification Performance of a High-Loaded Anoxic Sludge," Degremont Research Center, France, 1999.

Charpentier et al., ORP Regulation and Activated Sludge, 15 years of Experience, 19th Biennial Conference/AWQ of Vancouver—Jun. 1998.

Chen et al., "Minimization of activated sludge production by chemically stimulated energy spilling," Water Science and Technology, 2000, pp. 189-200, Vol. 42, No. 12, IWA Publishing.

Chen et al., "Effect of Sludge Fasting/Feasting on Growth of Activated Sludge Cultures," Wat. Res., 2001, pp. 1029-1037, vol. 35, No. 4, Elsevier Science Ltd., Pergamon.

Chudoba et al., "The Aspect of Energetic Uncoupling of Microbial Growth in the Activated Sludge Process-OSA System," Water Science and Technology, 1992, pp. 2477-2480, vol. 26, No. 9-11, IAWPRC.

"Contrashear filter solutions for waste water," for Contra Shear™, Jul. 29, 2005, p. 1 of 1, http://www.contrashear.co.nz/.

Dignac et al., "Chemical Description of Extracellular Polymers Implication on Activated Sludge Floc Structure," Water Science Technology, 1998, vol. 38, No. 8-9, pp. 45-53, Elsevier Science Ltd.

Dubois et al., "Colorimetric Method for Determination of Sugars and Related Substances," Analytical Chemistry, 1956, vol. 28, No. 3, pp. 350-356.

"Efficient treatment of high strength industrial and municipal wastewater" brochure by Envirex Inc., Jan. 1990.

Ekama et al., "Considerations in the Process Design of Nutrient Removal Activated Sludge Processes," Water Science and Technology, 1983, pp. 283-318, vol. 15, IAWPRC/Pergamon Press Ltd.

Frolund et al., "Extraction of Extracellular Polymers from Activated Sludge Using a Cation Exchange Resin," Water Research, 1996, vol. 30, No. 8, pp. 1749-1758, Elsevier Science Ltd.

"GAC Fluid Bed Efficient, economical bioremediation of BTEX groundwater" brochure by Envirex Inc., Dec. 1992.

Hartree, "Determination of Protein: A Modification of the Lowry Method that Gives a Linear Photometric Response," Analytical Biochemistry, 1972, vol. 48, pp. 422-427, Academic Press, Inc.

Harrison et al., "Transient Responses of Facultatively Anaerobic Bacteria Growing in Chemostat Culture to a Change from Anaerobic to Aerobic Conditions," Journal of General Microbiology, 1971, pp. 45-52, vol. 68.

Higgins et al., "Characterization of Exocellular Protein and Its Role in Bioflocculation," Journal of Environmental Engineering, 1997, vol. 123, pp. 479-485.

Higgins et al., "The Effect of Cations on the Settling and Dewatering of Activated Sludges: Laboratory Results," Water Environment Research, 1997, vol. 69, No. 2, pp. 215-224.

Holbrook et al., "A Comparison of Membrane Bioreactor and Conventional-Activated-Sludge Mixed Liquor and Biosolids Characteristics," Water Environment Research, 2005, vol. 77, No. 4, pp. 323-330.

Hong et al., "Biological Phosphorus and Nitrogen Removal Via the A/O Process: Recent Experience in the United States and United Kingdom," Water Science and Technology, 1984, pp. 151-172, Vol. 16, Vienna, Austria.

"Internally-fed Rotary Wedgewire Screens" brochure by Parkson Corporation for Hycor® Rotoshear® (year not provided).

Kakii et al., "Effect of Calcium Ion on Sludge Characteristics," J. Ferment. Technol., 1985, vol. 63, No. 3, pp. 263-270.

Kim et al., pH and Oxidation-Reduction Potential Control Strategy for Optimization of Nitrogen Removal in an Alternating Aerobic-Anoxic System, Water Environment Research, vol. 73, No. 1, 2001.

(56) References Cited

OTHER PUBLICATIONS

Klopping et al., "Activated Sludge Microbiology, Filamentous and Non-Filamentous Microbiological Problems and Biological Nutrient Removal," Water Environment Federation, Plant Operations Specialty Conference, Date Unknown.

Low et al., "The Use of Chemical Uncouplers for Reducing Biomass Production During Biodegradation," Water Science and Technology, 1998, pp. 399-402, vol. 37, No. 4-5, Elsevier Science Ltd./Pergamon.

Lowry et al., "Protein Measurement with the Folin Phenol Reagent," J. Bio. Chem., 1951, vol. 193, pp. 265-275.

Mahmoud et al., "Anaerobic Stabilisation and Conversion of Biopolymers in Primary Sludge-Effect of Temperature and Sludge Retention Time," Water Research, 2004, vol. 38, pp. 983-991, Elsevier Ltd.

Marais et al., "Observations Supporting Phosphate Removal by Biological Excess Uptake—A Review," Water Science and Technology, 1983, pp. 15-41, Vol. 15, IAWPRC/Pergamon Press Ltd.

Mavinic et al., "Fate of Nitrogen in Aerobic Sludge Digestion," J. Water Pollut. Control Fed., 1982, vol. 54, No. 4, pp. 352-360.

Moen et al., "Effect of Solids Retention Time on the Performance of Thermophilic and Mesophilic Digestion of Combined Municipal Wastewater Sludges," Water Environment Research, 2003, vol. 75, No. 6, pp. 539-548.

Murthy et al., "Factors Affecting Floc Properties During Aerobic Digestion: Implications for Dewatering," Water Environment Research, 1999, vol. 71, No. 2, pp. 197-202.

Murthy et al., "Optimizing Dewatering of Biosolids from Autothermal Thermophilic Aerobic Digesters (ATAD) Using Inorganic Conditioners," Water Environment Research, 2000, vol. 72, No. 6, pp. 714-721.

Nielsen et al., "Changes in the Composition of Extracellular Polymeric Substances in Activated Sludge During Anaerobic Storage," Appl. Microbiol. Biotechnol., 1996, vol. 44, pp. 823-830, Springer-Verlag.

Novak et al., "Mechanisms of Floc Destruction During Anaerobic and Aerobic Digestion and the Effect on Conditioning and Dewatering of Biosolids," Water Research, 2003, vol. 37, pp. 3136-3144, Elsevier Science Ltd.

Park et al., "The Digestibility of Waste Activated Sludges," Water Environment Research, 2006, vol. 78, No. 1, pp. 59-68.

Park et al., "The Effect of Wastewater Cations on Activated Sludge Characteristics: Effects of Aluminum and Iron in Floc," Water Environment Research, 2006, vol. 78, No. 1, pp. 31-40.

Euro-Matic, "Hollow Plastic Balls for Industrial Applications," Sep. 10, 2004, (7 pages), http://www.euro-matic.com/hollow.html.

International Search Report dated Feb. 7, 2011 from PCT Application No. PCT/US10/58653.

Ra et al., "Biological Nutrient Removal with an Internal Organic Carbon Source in Piggery Wastewater Treatment," Water Research, vol. 34, No. 3, pp. 965-973, 2000.

Rasmussen et al., "Iron Reduction in Activated Sludge Measured with Different Extraction Techniques," Water Research, 1996, vol. 30, No. 3, pp. 551-558, Elsevier Science Ltd.

"Rex VLR/SCC System" brochure by Envirex Inc., Bulletin No. 315-156, Oct. 1989.

"The Rotoscreen™ Escalating Fine Channel Screen Builds Pre-Coat to Provide High Solids Capture Rates with the Lowest Headloss," Jul. 29, 2005, p. 1 of 2-page screen, Parkson Corporation Web Home Page, http://www.parkson.com/Content.aspx?ntopicid=120&parent=process&processID=148.

"The Rotoshear® Internalling Fed Rotating Drum Screen's Wedgewire Construction Maximizes Capture for Efficient Screening with Minimal Operator Attention," Jul. 29, 2005, p. 1 of 2-page screen, Parkson Corporation Web Home Page, http://www.parkson.com/Content.aspx?ntopicid=133&parent=municipal&processID=149.

Strand et al., "Activated-Sludge Yield Reduction Using Chemical Uncouplers," Water Environment Research, 1999, pp. 454-458, vol. 71, No. 4.

Usfilter, "Aerator Products Aqua-Lator DDM Direct Drive Mixers," 2001, pp. 4.

Usfilter, "Aerator Products Aqua-Lator High Speed Surface Aerators," 1999, pp. 2-15.

Urbain et al., "Bioflocculation in Activated Sludge: An Analytic Approach," Water Research, 1993, vol. 27, No. 5, pp. 829-838, Pergamon Press Ltd.

U.S. Environmental Protection Agency, "Acid Digestion of Sediments, Sludges, and Soils," U.S. EPA Method 3050B, 1996, pp. 1-12.

Van Loosdrecht et al., "Maintenance, Endogeneous Respiration, Lysis, Decay and Predation," Water Science and Technology, 1999, pp. 107-117, vol. 39, No. 1, IAWQ/Elsevier Science Ltd../Pergamon.

"Vertical loop reactors—fine bubble power efficiency without fine bubble maintenance" brochure by Envirex Inc., Jan. 1986.

Westgarth, et al., "Anaerobiosis in the Activated-Sludge Process," (paper presentation and formal discussions) Department of Environmental Sciences and Engineering, School of Public Health, University of North Carolina, Chapel Hill, pp. 43-61 (neither publication information nor year provided).

Yasui et al., "An Innovative Approach to Reduce Excess Sludge Production in the Activated Sludge Process," Water Science and Technology, 1995, pp. 11-20, Vol. 30, No. 9, IAWQ/Pergamon.

Yasui et al., "A Full-Scale Operation of a Novel Activated Sludge Process Without Excess Sludge Production," Water Science and Technology, 1996, pp. 395-404, vol. 34, No. 3-4, Elsevier Science Ltd., Pergamon.

\* cited by examiner

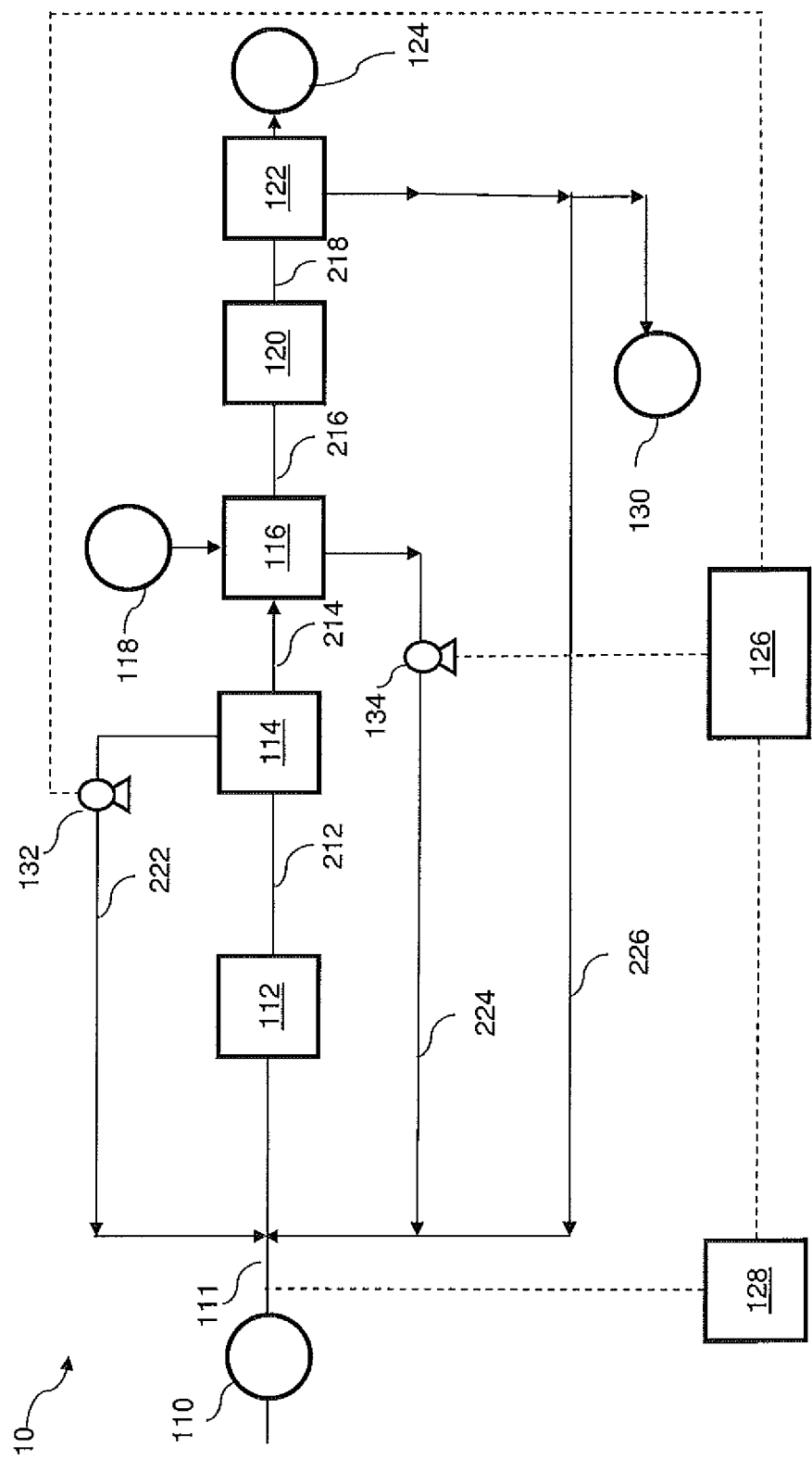

SYSTEMS AND METHODS FOR NUTRIENT REMOVAL IN BIOLOGICAL TREATMENT SYSTEMS

CROSS-REFERENCE TO RELATED APPLICATIONS

This application claims the benefit of U.S. Provisional Application No. 61/266,261, filed Dec. 3, 2009, titled STEP RECIRCULATION FOR ENHANCED NITROGEN REMOVAL IN AERATED ANOXIC SYSTEMS, which is incorporated herein by reference for all purposes.

BACKGROUND OF THE INVENTION

Field of the Invention

The present invention relates to systems and processes of wastewater treatment and, in particular, to systems and methods of treating wastewater utilizing biological treatments for nutrient removal.

SUMMARY OF THE INVENTION

One or more aspects of the present disclosure involve embodiments directed to a process for reducing a concentration of a nutrient from a wastewater. The process may comprise providing a wastewater comprising a nutrient and treating the wastewater in a first biological reactor to produce a first biologically treated mixed liquor. The first biologically treated mixed liquor is treated in a second biological reactor to produce a second biologically treated mixed liquor, and a first portion of the second biologically treated mixed liquor is treated in a third biological reactor to produce a third biologically treated mixed liquor having a reduced concentration of the nutrient. A second portion of the second biologically treated mixed liquor is introduced to at least one of the wastewater and the first biological reactor, and a first portion of the third biologically treated mixed liquor is introduced to at least one of the wastewater and the first biological reactor.

The process may further comprise biologically treating a second portion of the third biologically treated mixed liquor in a fourth biological reactor to produce a fourth biologically treated mixed liquor. In certain embodiments, treating at least one of the wastewater, the first biologically treated mixed liquor, and a first portion of the second biologically treated mixed liquor may comprise methods selected from the group consisting of aerobically treating, anoxically treating, aerated anoxically treating, and combinations thereof. The wastewater may be anoxically treated in the first biological reactor. The wastewater may be aerated anoxically treated in the first biological reactor. The first biologically treated mixed liquor may be aerobically treated in the second biological reactor. The first portion of the second biologically treated mixed liquor may be anoxically treated in the third biological reactor.

The process may further comprise separating the fourth biologically treated mixed liquor in a separator to produce an activated sludge and an effluent stream having a reduced concentration of the nutrient. The process may also further comprise combining at least a portion of the activated sludge with the wastewater. Introducing the second portion of the second biologically treated mixed liquor to at least one of the wastewater and the first biologically treated mixed liquor may comprise adjusting a flowrate of the second portion of the second biologically treated mixed liquor. Additionally, adjusting the flowrate of the second portion of the second biologically treated mixed liquor may be based on at least one characteristic of the wastewater, the first biologically treated mixed liquor, the second biologically treated mixed liquor, the third biologically treated mixed liquor, and the fourth biologically treated mixed liquor. Introducing the first portion of the third biologically treated mixed liquor to at least one of the wastewater and the first biological reactor may comprise adjusting a flowrate of the first portion of the third biologically treated mixed liquor. Adjusting the flowrate of the first portion of the third biologically treated mixed liquor may be based on at least one characteristic of the wastewater, the first biologically treated mixed liquor, the second biologically treated mixed liquor, the third biologically treated mixed liquor, and the fourth biologically treated mixed liquor. The nutrient may be selected from the group consisting of nitrogen, phosphorus, and combinations thereof.

One or more further aspects of the present disclosure are directed to a wastewater treatment system for reducing a concentration of a nutrient from a wastewater comprising a source of wastewater comprising a nutrient, and a first biological reactor having an inlet fluidly connected to the source of the wastewater. A second biological reactor having an inlet fluidly connected to the first biological reactor, and a third biological reactor having an inlet fluidly connected to the second biological reactor, and an outlet to deliver a mixed liquor stream having a reduced concentration of the nutrient is also provided. A first mixed liquor recycle line fluidly connecting an outlet of the second biological reactor to at least one of the source of wastewater and the first biological reactor, and a second mixed liquor recycle line fluidly connecting an outlet of the third biological reactor to at least one of the source of wastewater and the first biological reactor is additionally provided.

In certain embodiments of the system, at least one of the first biological reactor, the second biological reactor, and the third biological reactor may be selected from the group consisting of an aerobic reactor, an anoxic reactor, an aerated anoxic reactor, and an anaerobic reactor. The first biological reactor may be an anoxic reactor. The first biological reactor may also be an aerated anoxic reactor. The second biological reactor may be an aerobic reactor. The third biological reactor may be an anoxic reactor. The first biological reactor may have at least two anoxic zones. The first mixed liquor recycle line may be fluidly connected to a first zone of the first biological reactor, and the second mixed liquor recycle line may be fluidly connected to a second zone of the first biological reactor.

The system may further comprise a fourth biological reactor having an inlet fluidly connected to the third biological reactor. The system may also further comprise a separator having an inlet fluidly connected downstream of the third biological reactor. The system may yet further comprising an activated sludge recycle line fluidly connected to an outlet of the separator and the source of wastewater. The system may also comprise a controller configured to generate a first output signal that energizes a first pump in the first mixed liquor recycle line. The controller may be further configured to generate a second output signal that energizes a second pump in the second mixed liquor recycle line. At least one of the first output signal and the second output signal is based on a measured input signal of at least one of a characteristic of the wastewater and the mixed liquor stream having a reduced concentration of the nutrient. The controller may be further configured to generate a third output signal that adjusts at least one aeration system in at least one of the first biological reactor, the second biological reactor, the third biological reactor, and the fourth biological reactor. The nutrient may be selected from the group consisting of nitrogen and phosphorus.

One or more further aspects of the present disclosure are directed to a method of facilitating wastewater treatment in a wastewater treatment system for reducing a concentration of a nutrient from a wastewater having a source of wastewater, a first biological reactor, a second biological reactor, a third biological reactor, and a recycle stream fluidly connecting an outlet of the second biological reactor to at least one of the source of wastewater and the first biological reactor. The method may comprise fluidly connecting an outlet of the third biological reactor to at least one of the source of wastewater and the first biological reactor. The method may further comprise providing a controller configured to energize a first pump that is disposed to deliver a first biologically treated mixed liquor from the second biological reactor to at least one of the source wastewater and the first biological reactor, and further configured to energize a second pump that is disposed to deliver a second biologically treated mixed liquor from the third biological reactor to at least one of the source of wastewater and the first biological reactor. At least one of the first pump and the second pump may be energized based on a characteristic of a stream of the wastewater treatment system. The characteristic may be selected from the group consisting of nitrogen concentration, phosphorus concentration, temperature, pressure, flowrate, pH, dissolved oxygen concentration, biological oxygen demand, chemical oxygen demand, oxygen uptake ratio, viscosity, and combinations thereof. The nutrient may be selected from the group consisting of nitrogen, phosphorus, and combinations thereof.

BRIEF DESCRIPTION OF THE DRAWING

The accompanying drawing is not intended to be drawn to scale. For purposes of clarity, not every component may be labeled in the drawing, nor is every component of each embodiment of the invention shown where illustration is not necessary to allow those of ordinary skill in the art to understand the invention. In the drawings:

FIG. 1 is a flow diagram illustrating a representative treatment system pertinent to one or more aspects of the invention.

DETAILED DESCRIPTION OF THE INVENTION

The invention is directed to systems and methods of treating water, wastewater or sludge to, for example, reduce the amount or concentration of undesirable species, and render water suitable for further downstream processing, secondary uses, or discharge to the environment. One or more aspects of the invention relate to wastewater treatment systems and methods of operation and facilitating thereof. The invention is not limited in its application to the details of construction and the arrangement of components, systems, or subsystems set forth herein, and is capable of being practiced or of being carried out in various ways. Typically, the waste to be treated, such as wastewater or a wastewater stream, contains waste matter which, in some cases, may comprise solids and soluble and insoluble organic and inorganic material. Prior to discharge to the environment, such streams may require treatment to decontaminate or at least partially render the wastewater streams benign or at least satisfactory for discharge under established regulatory requirements or guidelines. For example, the water may be treated to reduce its nitrogen content or concentration, or phosphorus content or concentration or other characteristic such as biological oxygen demand (BOD) content to within acceptable limits.

Some aspects of the invention may involve biologically treating wastewater by promoting bacterial digestion of biodegradable material, conversion of an undesirable species, such as a nutrient, to a more desirable species of at least a portion of at least one species in the wastewater.

As used herein, the terms "water," "wastewater," "wastewater stream," and "influent wastewater" refer to water to be treated such as streams or bodies of water from residential, commercial, municipal, industrial, and agricultural sources, as well as mixtures thereof, that typically contain at least one undesirable species, or pollutant, comprised of biodegradable, inorganic or organic, materials which may be decomposed or converted by biological processes into environmentally benign or at least less objectionable compounds. The water to be treated may also contain biological solids, inert materials, organic compounds, including recalcitrant or a class of compounds that are difficult to biodegrade relative to other organic compounds as well as constituents from ancillary treatment operations such as, but not limited to nitrosamines and endocrine disruptors.

As used herein, the term "anoxic" refers to an environment in which oxygen is either not present or is at a level such that the biological demand of the system cannot be met by the oxygen level. "Aerated anoxic" conditions allow for air or oxygen to be introduced to the system at levels below the estimated oxygen demand for the system. Typically, anoxic and aerated anoxic conditions suggest the lack of presence of dissolved oxygen concentration. The anoxic zones or reactors may utilize endogenous respiration or commercially available carbon sources, such as ethanol, which can be added to the anoxic zone or reactor at a predetermined amount or rate, and can be adjusted throughout a treatment process.

Non-limiting examples of anoxic reactors that can be utilized in one or more configurations of the present treatment systems includes but is not limited to the Orbal®, Vertical Loop Reactor (VLR™), and VertiCel® systems, from Siemens Water Technologies Corp.

At least one embodiment of the present invention includes a plurality of biological reactors, bioreactors, or reactors. As used herein, a single "biological reactor," "bioreactor," or "reactor" may include one or more treatment zones or vessels. According to one embodiment, a first biological reactor may comprise a first biological population. As used herein, the phrase "biological population" defines a mixture of different microorganisms. It is understood that the ratio of each of the different microorganisms to one another may differ according to conditions and residence time within the bioreactors. The biological reactor may, but need not, be aerated depending on the desired conditions. Operating conditions of the bioreactor may be changed to alter growing conditions of the biological population. That is to say, operating conditions in a biological reactor may alternate between anoxic and aerobic conditions.

At least one embodiment of the present invention includes a bioreactor having one or more treatment zones. As used herein, the phrase "treatment zone" is used to denote an individual treatment region. Individual treatment regions may be housed in a single vessel with one or more compartments. Alternatively, individual treatment regions may be housed in separate vessels, wherein a different treatment is carried out in separate vessels. The treatment zone, i.e. the vessel, tank, or compartment, may be sized and shaped according to a desired application and volume of wastewater to be treated to provide a desired hydraulic retention time. Accordingly, a biological reactor may comprise one or more vessels or compartments. For example, a biological reactor may contain two or more treatment zones wherein the treatment zone proximate an inlet of the biological reactor may contain more oxygen than the treatment zone proximate an outlet of the biological reactor.

One or more of the treatment zones may be operated as a batch flow mode, a sequencing batch reactor, or as a continuous flow batch reactor having a continuous wastewater inflow. The treatment zone or zones may be operated under anoxic, aerobic, or anaerobic conditions as desired for a particular purpose. The microorganisms used in the individual treatment zones may be any microorganism or combination of microorganisms suitable to thrive in anoxic, aerobic, anaerobic conditions, and combinations thereof. Representative aerobic genera, include the bacteria *Acinetobacter, Pseudomonas, Zoogloea, Achromobacter, Flavobacterium, Norcardia, Bdellovibrio, Mycobacterium, Shpaerotilus, Baggiatoa, Thiothrix, Lecicothrix*, and *Geotrichum*, the nitrifying bacteria *Nitrosomonas*, and *Nitrobacter*, and the protozoa Ciliata, Vorticella, Opercularia, and Epistylis. Representative anoxic genera include the denitrifying bacteria *Achromobacter, Aerobacter, Alcaligenes, Bacillus, Brevibacterium, Flavobacterium, Lactobacillus, Micrococcus, Proteus, Pserudomonas*, and *Spirillum*. Anaerobic organisms typically present include *Clostridium* spp., *Peptococcus anaerobus, Bifidobacterium* spp., *Desulfovibrio* spp., *Corynebacterium* spp., *Lactobacillus, Actinomyces, Staphylococcus* and *Escherichia coli*. In certain embodiments, the dissolved oxygen content in the aerobic reactor is sufficient to support the biological oxygen demand. In certain examples, the dissolved oxygen content may be in a range between about 0.5 mg/L and about 2.0 mg/L.

A "treated" portion is typically water having less undesirable species, pollutants, or nutrients relative to a starting wastewater after one or more treatment stages, such as one or more biological or separation operations.

One or more of the inventive systems disclosed herein may comprise one or more biologically-based or non-biologically-based unit operations. The systems and techniques of the invention may be effected as, or at least as a portion, of decontamination or treatment systems that typically include one or more of pre-treatment, primary treatment, secondary treatment, and post-treatment or polishing operations. Further, the treatment facilities that may employ one or more aspects of the invention may include at least one of the pre-treatment, primary treatment, secondary treatment, and post-treatment or polishing operations.

Pretreatment systems and operations may remove grit, sand, and gravel. Primary treatment operations or systems may involve at least partial equalization, neutralization, and/or removal of large insoluble material of the water to be treated such as, but not limited to fats, oils, and grease. The pretreatment and primary treatment operations may be combined to remove such materials as well as settleable solids and floating bodies, and insoluble objects such as rags and sticks. Primary clarifiers may be utilized to separate solids.

Secondary treatment unit operations or systems may involve biological treatment such as those that typically employ a biomass with bacteria or a consortium of microorganisms to at least partially hydrolyze or convert biodegradable material such as, but not limited to sugar, fat, organic molecules, and compounds that create an oxygen demand in the water. Some advantageous aspects of the invention may utilize biological processes and systems to remove or convert at least a portion of the organic material in the water to be treated or wastewater. The secondary treatment unit may include processes that involve biological nitrification/denitrification and phosphorus removal.

Post-treatment or polishing operations or systems may include biological treatments, chemical treatments, and separation systems. The post-treatment operations may include processes that involve biological nitrification/denitrification and phosphorus removal. Chemical treatments that may be used may include chemical oxidation and chemical precipitation. Separation systems may include dissolved inorganic solids removal by ion exchange, ultrafiltration, reverse osmosis, or electrodialysis. Further treatment processes may involve disinfection, decontamination or inactivation of at least a portion of any residual microorganisms by chemical or physical means. For example, disinfection may be effected by exposure to any one or more of oxidizing agents or to actinic radiation. Commercially available filtration systems that may be utilized in some embodiments of the invention include those employing the CMF-S™ continuous membrane filtration modules as well as the MEMCOR® CMF (Pressurized) XP, CP, and XS membrane filtration systems, from Siemens Water Technologies Corp. Other separators that may be used include filter presses and centrifuges.

In the treatment of wastewater, removal of nutrients from the wastewater prior to disposal is typically desirable. Nutrients, such as nitrogen and phosphorus, are taken up by microorganisms and used in their biological processes. Because both nitrogen and phosphorus may impact receiving water quality, the discharge of one or both of these constituents may have to be controlled.

Biological nitrogen removal to nitrogen gas is typically a two-step process. In the first step, ammonia is oxidized to nitrate (nitrification) and various process configurations are then employed to provide the nitrate as an electron acceptor for biological respiration so that it may be reduced to molecular nitrogen (denitrification) under anoxic conditions. Nitrifying bacteria, such as *Nitrosomonas* and *Nitrobacter* may oxidize ammonia sequentially to nitrite and then to nitrate, respectfully. Additionally, oxidation of ammonia may occur by way of *Nitrosococcus, Nitrospira, Nitrosocyctis*, and *Nitrosoglea*, and the oxidation of nitrite by way of *Nitrocystis*. Typically, nitrification in wastewater treatment processes is typically attributed primarily to *Nitrosomonas* and *Nitrobacter*.

The removal of nitrogen in the form of nitrate by conversion to nitrogen gas may be accomplished biologically under anoxic conditions in a denitrification process. Several bacteria may be used to accomplish this conversion including *Achromobacter, Aerobacter, Alcaligenes, Bacillus, Brevibacterium, Flavobacterium, Lactobacillus, Micrococcus, Proteus, Pseudomonas*, and *Spirillum*. Nitrate is converted to nitrite which is then converted to nitric oxide, nitrous oxide and nitrogen gas, which are all gaseous products which may be released to the atmosphere.

Biological phosphorus removal may be accomplished through phosphorus uptake by microorganisms. Biological phosphorus removal is a two step process. Phosphorus is first released from microorganisms such as phosphorus accumulating organisms (POAs), that are capable of storing BOD. This typically occurs in an anoxic or aerated anoxic environment in which the BOD needs to be stored by the microorganisms because there is no oxygen available to metabolize it. The energy required for storage is generated by breaking a polyphosphate bond, which releases phosphate from the microorganisms. As the PAOs move progressively through the treatment system into zones with higher levels of oxygen, they are able to metabolize the stored BOD. As they gain energy from this BOD, they reclaim the available phosphate in the wastewater, accumulating it for later use. PAOs accustomed to living within a continuous cycle of anoxic to aerobic environments, develop the capability to store more phosphorus than they need, termed luxury phosphorus uptake. The removal of phosphorus may be accomplished by removing a portion of the microorganisms that have taken up the excess phosphorus.

In a typical nutrient removal system, wastewater from a source of wastewater may be treated by processing through a series of biological reactors. In certain systems, the wastewater is first treated under anoxic conditions in a first biological reactor to produce a first biologically treated mixed liquor. The first biologically treated mixed liquor may then be introduced into a second biological reactor to be treated under aerobic conditions to produce a second biologically treated mixed liquor. A first portion of the second biologically treated mixed liquor may be introduced into a third biological reactor to be treated under anoxic conditions to produce a third biologically treated mixed liquor having a reduced concentration of at least one nutrient. The third biological reactor typically operates as a polishing step to remove any of the remaining nitrates in the system. The third biologically treated mixed liquor may undergo further downstream processing, and be discharged to the environment.

Typically, the wastewater influent flow rate to a nutrient removal system is not controlled by the treatment system, but is instead based on flow of wastewater from the source. Therefore, in conventional nutrient removal systems, the residence time of the wastewater in the system is generally not sufficient to reduce the concentration of nutrients in the wastewater to an acceptable level. To address this issue, it has been established that a mixed liquor recycle stream that introduces a portion of the second biologically treated mixed liquor from the second biological reactor to the wastewater to be treated or the first biological reactor is useful to increase the residence time of the mixed liquor in the system, thereby increasing the efficiency of the process to achieve a concentration of nutrients in the effluent stream that complies with established regulatory requirements or guidelines. The recycle stream allows the mixed liquor a longer residence time within the process so as to allow a greater amount of time for biological treatment. This may include the recycle of nitrates from the second biological reactor to the first biological reactor. It is well established that a mixed liquor recycle stream that is at least four times an average influent flow rate is an optimal recycle rate for conventional nutrient removal systems. The average flow rate may be calculated over a predetermined time period, such as, for example, an eight-hour time period, a 24 hour time period, or a one-week-time period.

The present invention addresses the problem found in conventional treatment systems that may experience significant fluctuations in wastewater influent flow rate and nutrient concentration in the influent wastewater, which can be associated with the fluctuating demands for water use associated with the source of the water, or with environmental conditions such as rainfall or precipitation. These fluctuations may be due to diurnal and daily nutrient load and flow fluctuations. For example, the load and flow fluctuations may occur throughout a given day, week, month, or year, or may be seasonal, based on weather or other considerations. Previously, it was not known that during periods of time when the flow or load drops, such as during the night, and early morning, excessive oxygen and nitrates are recycled from the second biological reactor to the first biological reactor. It was also not known that this was causing poisoning of the first biological reactor, and suppression of the ability of this biological reactor to participate in denitrification. The third biological reactor also becomes overloaded with oxygen and nitrates which leads to a treated product effluent having nutrient levels exceeding the design requirements. This may lead to higher operating costs due to inefficiencies in the process.

The systems and methods of the invention may provide cost advantages relative to other wastewater treatment systems through use of an additional mixed liquor recycle stream in the wastewater treatment system. The wastewater treatment systems and methods of the present invention may reduce or eliminate inefficiencies that may occur within a biological reactor of the system and may also overcome some of the difficulties in achieving a consistent effluent product that complies with established regulations or guidelines. This may be done by removing inefficiencies associated with nutrient removal within the system that may cause fluctuations in undersirable consituents in the effluent stream. The systems and methods of the present invention also may reduce costs due to less need for further processing of the effluent stream downstream of the nutrient removal system. The wastewater treatment systems and methods of the present invention may also reduce and separate the flow of the mixed liquor recycle by dividing a conventional recycle stream into two or more separate streams, which may exit the same or different biological reactor, and are introduced into the same or different zones of another biological reactor, or into the influent wastewater. For example, the wastewater treatment processes and systems of the present invention may contain a first mixed liquor recycle stream that may introduce a treated mixed liquor from an aerobic reactor to a first zone of the first anoxic reactor. A second mixed liquor recycle stream may also be added that may introduce a treated mixed liquor from a second anoxic reactor to a second zone of the first anoxic reactor. In certain embodiments, each of the flow rates of the recycle streams may be adjusted to be at most half of the recycle stream utilized in a conventional system. For example, if the conventional system was operating with one recycle stream of about four times the influent wastewater flow rate, then each of the recycle streams of the present invention would operate at about two times the influent wastewater flow rate, or less, depending on the operating conditions, and operator input. Each flow rate of the mixed liquor recycle streams may be controlled by any measured parameter or condition of the system, or by operator input. It has been unexpectedly found that inefficiencies within the treatment system may be reduced by splitting the single conventional recycle stream into two streams. The first recycle stream may recycle mixed liquor from the second biological reactor to the first biological reactor, and the second recycle stream may recycle mixed liquor from the third biological reactor to the first biological reactor. In preferred embodiments, the first recycle stream may recycle mixed liquor from the second biological reactor to a first anoxic zone of the first biological reactor, and the second recycle stream may recycle mixed liquor from the third biological reactor to a zone of the first biological reactor downstream of the first zone. Splitting the recycle stream and reducing the flow of mixed liquor that is recycled to the first biological reactor unexpectedly improves nutrient removal from the system, and avoids the poisoning of the first biological reactor. It is believed that the lower amounts of oxygen and nitrates being returned to the first biological reactor reduce or eliminate the suppression of the microorganism ability to function properly, which allows for increased denitrification and nutrient removal. By using a second recycle stream which recycles mixed liquor from a third biological reactor to the first biological reactor, it was found that further denitrification of the mixed liquor may occur to allow for greater efficiencies in the third biological reactor polishing step.

The present invention may also provide for sustainability of the effluent nutrient at acceptable levels through the use of two recycle streams. The two recycle streams may provide for finer control of the system. By reducing the flow rate of the first recycle stream from the aerobic reactor to a first zone of the anoxic first biological reactor, the likelihood of adding excess oxygen and nitrates to the first zone of the anoxic reactor, which would poison the reactor, is reduced. Additionally, the reduction of the flow rate of the first recycle stream allows for a longer residence time for nitrates to be converted to nitrogen gas in this zone. The longer residence time also unexpectedly and positively impacts phosphorus removal from the system. It is thought that the longer residence time of the mixed liquor in the system allows more BOD to be absorbed by the POAs and thus, more phosphate may be released in the first anoxic or aerated anoxic zone. As the microorganisms move through the system into more aerobic zones, stored BOD may be metabolized and more phosphate may be absorbed by the POAs. The addition of a second recycle stream from the anoxic environment of the third biological reactor to a second zone of the anoxic first biological reactor, may increase the efficiency of the third biological reactor to consistently release an effluent having an acceptable reduced nutrient concentration. The present invention reduces variations in the flow of wastewater and mixed liquor in each zone or reactor of the system to improve the overall stability of the system.

Additionally, one or more aspects of the present treatment methods and systems may utilize a control system that may be configured to adjust one or more of the recycle streams. For example, the control system may be configured to adjust one or more of the recycle streams based on a characteristic or measured parameter of the system, or based on operator input. These attributes of the present treatment methods and systems may allow for better control of the biological treatment of the wastewater such that a more consistent effluent stream comprising a reduced concentration of nutrients may be achieved.

In certain embodiments of the invention, treatment processes for reducing a concentration of a nutrient from a wastewater comprises providing a wastewater comprising a nutrient are provided. Nutrients in the wastewater may comprise nitrogen in various forms not limited to organic nitrogen, ammonia, nitrates, nitrites, and mixtures thereof. The nutrients in the wastewater may additionally, or in the alternative comprise phosphorus in various forms not limited to orthophosphate ($PO_4^{-3}$), polyphosphate ($P_2O_7$), organically bound phosphorus, and mixtures thereof. The treatment processes may further comprise treating the wastewater in a first biological reactor to produce a first biologically treated mixed liquor, treating the first biologically treated mixed liquor in a second biological reactor to produce a second biologically treated mixed liquor; treating a first portion of the second biologically treated mixed liquor in a third biological reactor to produce a third biologically treated mixed liquor having a reduced concentration of the nutrient. The treatment processes may further comprise introducing a second portion of the second biologically treated mixed liquor to at least one of the wastewater and the first biological reactor; and introducing a first portion of the third biologically treated mixed liquor to at least one of the wastewater and the first biological reactor.

The first biological reactor may be an anoxic or aerated anoxic reactor that carries out denitrification of the wastewater. In certain embodiments, nitrification may also occur in the first biological reactor. The first biological reactor may comprise more than one treatment zone. In aerated anoxic reactors used as a first biological reactor that comprise more than one treatment zone, each zone may have a different concentration of oxygen. For example, in a three-zone aerated anoxic reactor, the first zone proximate the wastewater inlet to the reactor may have a lower amount of oxygen supplied to the zone than a second zone, and the second zone may have a lower amount of oxygen supplied to the zone than a third zone proximate the mixed liquor outlet of the reactor. The concentration of oxygen in the reactor may be controlled based at least in part by other measured parameters of the system, or by operator input. Another way of measuring the anoxic nature of these zones is by monitoring the oxidation reduction potential (ORP) in each of these zones. The ORP in each of the aerated anoxic zones is typically negative, and the ORP value increases gradually from an inlet to an outlet of the biological reactor. For example, in the first biological reactor, the ORP may gradually increase from a first zone to a third zone of the biological reactor. In certain examples, the first aerated anoxic zone may be about −250 mV, the second aerated anoxic zone may be about −150 mV, and the third zone may be about −50 mV. The ORP in each biological reactor and each zone of a biological reactor may be monitored throughout the treatment process, and adjusted as desired to achieve suitable treatment conditions.

The second biological reactor may be an aerobic reactor that carries out nitrification of the first biologically treated mixed liquor. The second biological reactor may produce a second biologically treated mixed liquor, and may comprise more than one treatment zone having different dissolved oxygen concentrations to enhance aerobic treatment of the first biologically treated mixed liquor. For example, in a two-zone aerobic reactor, the first zone proximate the first biologically treated mixed liquor may have a dissolved oxygen concentration of 0.5 mg/L and the second zone proximate a second biologically treated mixed liquor outlet may have a dissolved oxygen concentration of 2.0 mg/L.

The third biological reactor may be an anoxic reactor that carries out a denitrification of a first portion of the second biologically treated mixed liquor. The third biological reactor typically "polishes" the second biologically treated mixed liquor to remove any residual nitrates to produce a third biologically treated mixed liquor having a reduced concentration of nutrients. The third biological reactor may comprise one or more treatment zones. At least a portion of the third biologically treated mixed liquor may be discharged to the environment or processed further by additional reactors or unit operations located downstream of the third biological reactor.

In certain embodiments of the invention a second portion of the second biologically treated mixed liquor may be introduced into the first biological reactor. This portion of the second biologically treated mixed liquor may be introduced into one or more zones of the first biological reactor. In one example, the second portion of the second biologically treated mixed liquor may be introduced into a first zone proximate the wastewater influent inlet to the first biological reactor.

A first portion of the third biologically treated mixed liquor may be introduced into the first biological reactor. This portion of the third biologically treated mixed liquor may be introduced into one or more zones of the first biological reactor. In one example, the first portion of the third biologically treated mixed liquor may be introduced into a third zone proximate a mixed liquor outlet of the first biological reactor.

As discussed above, a portion of the third biologically treated mixed liquor may be further processed downstream of the third biological reactor. This portion of the third biologically treated mixed liquor may be introduced into one or more biological reactors to produce a fourth biologically treated mixed liquor, such as an aerobic reactor. The fourth biologically treated mixed liquor may be introduced into a separator to produce an activated sludge and an effluent stream having a reduced concentration of nutrient. At least a portion of the activated sludge may be introduced to the wastewater by a return activated sludge recycle line.

Alternatively, this portion of the third biologically treated mixed liquor may be introduced directly into a separator to produce an effluent stream having a reduced concentration of nutrient. The separator may be any separator suitable for a particular purpose, such as a clarifier, ultrafiltration membranes, a membrane bioreactor, a hydrocyclone, and combinations thereof.

Non-limiting examples of clarifiers or components thereof that may be utilized in one or more configurations of the present treatment systems includes but is not limited to the ENVIREX™ FLOC-CLARIFIER system, the SPIRA-CONE™ upflow sludge blanket clarifier, RIM-FLO® circular clarifier, and the TRANS-FLO® clarifier, from Siemens Water Technologies Corp.

Some embodiments of the treatment system and methods of the invention may comprise pumps that may be used in the recycle lines to remove a portion of the second biologically treated mixed liquor and a portion of the third biologically treated mixed liquor from the second biological reactor and the third biological reactor, respectively, and introduce these mixed liquors into the wastewater or the first biological reactor. Pumps used in the system and techniques of the invention may be any pump suitable for delivering a mixed liquor to a fluid, such as a wastewater stream, or to a biological reactor. For example, the pumps used in the system may be variable speed pumps, low head centrifugal pump, slow-speed axial flow pumps, or positive displacement pumps, such as variable speed pumps, peristaltic pumps, diaphragm pumps, or progressing cavity pumps.

Some embodiments of the treatment systems and methods of the invention may comprise a controller that may facilitate or regulate one or more operating parameters of the treatment system. For example, a controller may be configured to adjust a rate of recycle of one or more streams, such as a mixed liquor recycle stream, an aeration rate in any one of the unit operations of the treatment system, or a dissolved oxygen concentration in a fluid in any one of the unit operations of the system.

The controller may respond to signals from timers or sensors positioned at any particular location within the treatment system. For example, a sensor may be positioned to measure a characteristic of the influent wastewater such as a flow rate of the wastewater. The controller may be configured to receive an input signal from a sensor and may be further configured to generate an output signal to modify a parameter of the system. For example, the controller may generate an output signal to energize a pump in the system, by adjusting the pump speed, and starting or stopping the pump. The controller may also receive input from an operator regarding target setpoints or ranges for parameters of the system, and generate an output signal based on the input. For example, an operator may input a percentage value for a recycle flow rate based on a parameter of the system such as the wastewater stream flow rate. In certain embodiments, the recycle stream flow rates may be in a range of from about 60% to about 200% of the flow rate of the influent wastewater stream. The flow rate of each recycle stream may be the same or different, and may be adjusted continuously or periodically throughout the treatment process.

In some aspects of the invention, the wastewater flowrate may be measured to further improve the control techniques of the invention. For example, flow pacing techniques may be utilized to adjust the flow rate of mixed liquor recycle streams and return activated sludge introduced into the wastewater and the first biological reactor. Such techniques typically determine the recycle flow rates based on a parameter of the system, such as, but not limited to, nitrogen concentration, phosphorus concentration, temperature, pressure, flowrate, pH, dissolved oxygen concentration, biological oxygen demand, chemical oxygen demand, oxygen uptake ratio, viscosity, and combinations thereof.

Other sensors may monitor one or more operational parameters such as pressure or temperature, one or more characteristics of the wastewater, mixed liquor or treated product or effluent streams. Additional sensors may be disposed in or otherwise positioned in any of the recycle streams to provide an indication of a flow rate thereof at, below, or above a desired target rate. The controller may then respond by generating a control signal causing an increase or decrease in the flow rate of one or more recycle streams. The target recycle flow rate of the mixed liquor from the second biological reactor or the third biological reactor may be dependent on an operating parameter of the treatment system or a characteristic of the wastewater to be treated or the treated product. For example, the target recycle flow rate may be a multiple of, for example, two times, the influent flow rate of the incoming wastewater to be treated, so as to obtain an acceptable level of particular contaminants in the treated product that is below levels that may be required by regulatory laws or guidelines.

In accordance with one or more embodiments of the invention, the systems and techniques of the invention may be configured to recognize conditions that obviates or reduces the need for adjusting a flow rate of the recycle streams. The systems and techniques of the invention may thus be further configured to adjust, e.g., reduce or minimize, the control signal during such reduced demand conditions. For example, rain may increase the flow rate of the fluid in sewer systems. The increased flow condition may be manifested as a direct flow meter measurement. The increased flow rate, depending on the amount of precipitation, may effectively reduce the demand on the treating system. Thus, some embodiments of the systems and techniques of the invention may be configured to recognize elevated fluid flow rates associated with rain, and respond appropriately to adjust recycle stream flow rates.

The controller may be implemented using one or more computer systems which may be, for example, a general-purpose computer. Alternatively, the computer system may include specially-programmed, special-purpose hardware, for example, an application-specific integrated circuit (ASIC) or controllers intended for water treatment systems. The computer system may include one or more processors typically connected to one or more memory devices. Software, including programming code that implements embodiments of the invention, may be stored on a computer readable and/or writeable nonvolatile recording medium, and then typically copied into memory wherein it may then be executed by one or more processors. Components of the computer system may be coupled by one or more interconnection mechanisms, which may include one or more busses, e.g., between components that are integrated within a same device, and/or a network, e.g., between components that reside on separate discrete devices. The interconnection mechanism typically enables communications, e.g., data, instructions, to be exchanged between components of the system.

The computer system may also include one or more input devices, for example, a keyboard, mouse, trackball, microphone, touch screen, and other man-machine interface devices as well as one or more output devices, for example, a printing device, display screen, or speaker. In addition, the computer system may contain one or more interfaces that may connect the computer system to a communication network, in addition or as an alternative to the network that may be formed by one or more of the components of the system.

According to one or more embodiments of the invention, the one or more input devices may include sensors for measuring any one or more parameters of the treatement system and/or components thereof. Alternatively, the sensors, the metering valves and/or pumps, or all of these components may be connected to a communication network that is operatively coupled to the computer system. Any one or more of the above may be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be affected by utilizing any suitable technique including but not limited to those utilizing wireless protocols.

The controller may include one or more computer storage media such as readable and/or writeable nonvolatile recording medium in which signals may be stored that define a program to be executed by one or more processors. The medium may, for example, be a disk or flash memory. In typical operation, the one or more processors may cause data, such as code that implements one or more embodiments of the invention, to be read from the storage medium into a memory that allows for faster access to the information by the one or more processors than does medium.

Although the computer system is described by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 126 may be performed in separate computers, which in turn, may be in communication through one or more networks.

Further aspects of the invention may involve or be directed to computer-readable media, or providing computer-readable media, that facilitates the various features of the treatment approaches described herein.

In still further embodiments of the invention, a method of facilitating wastewater treatment in a wastewater system for reducing a concentration of the nutrient from a wastewater is provided. The method may comprise fluidly connecting an outlet of the third biological reactor to at least one of the source of wastewater and the first biological reactor. The method may further comprise providing a controller configured to energize a pump that is disposed to deliver a first biologically treated mixed liquor from the second biological reactor to at least one of the source wastewater and the first biological reactor, and further configured to energize a second pump that is disposed to deliver a second biologically treated mixed liquor from the third biological reactor to at least one of the source of wastewater and the first biological reactor. At least one of the first pump and the second pump may be energized based on a characteristic of a stream of the wastewater treatment system.

FIG. 1 exemplarily illustrates an embodiment in accordance with some aspects of the invention. The treatment system 10 may be fluidly connected or connectable to a source 110 of wastewater. The wastewater can comprise an undesirable constituent, such as a nutrient. In accordance with any one of the aforementioned aspects of the invention, treatment system 10 may comprise one or more treatment unit operations, which may include one or more biological treatment processes and one or more separation processes.

Source 110 of wastewater can be a water collection system from any one or more of a municipality, a residential community, and an industrial or a commercial facility, and an upstream pre-treatment system, or combinations thereof. For example, source 110 may be wastewater from a sewer system.

Treatment system 10 may comprise a first biological treatment reactor 112 that promote nitrification and denitrification of the wastewater to be treated. Biological treatment reactor 112 can comprise or is configured to contain a biomass of microorganisms that can metabolize nutrients in the wastewater or convert components of the wastewater to usable or more desirable constituents. First biological treatment reactor 112 may contain more than one zone within the reactor. First biological treatment reactor 112 may include aeration to help maintain aerobic, aerated anoxic, and anoxic zones within the reactor.

First biological treatment reactor 112 may receive wastewater stream 111 from source of wastewater 110 and can produce a first biologically treated mixed liquor 212 which may be introduced into second biological treatment reactor 114. Second biological treatment reactor 114 may comprise or is configured to contain a biomass of microorganisms that can metabolize nutrients in the first biologically treated mixed liquor 212 or convert components of the first biologically treated mixed liquor to usable or more desirable constituents. Second biological treatment reactor 114 may include aeration to help maintain an aerobic environment within the biological treatment reactor.

Second biological treatment reactor 114 produces a second biologically treated mixed liquor. First portion of second biologically treated mixed liquor 214 may be introduced into third biological treatment reactor 116. Second portion of second biologically treated mixed liquor 222 may be introduced to at least one of wastewater stream 111 and first biological reactor 112. Third biological treatment reactor 116 may comprise or is configured to contain a biomass of microorganisms that can metabolize nutrients in second biologically treated mixed liquor 214 or convert components of the second biologically treated mixed liquor to usable or more desirable constituents. Third biological treatment reactor 116 may include aeration but, typically, aeration is not included in this biological treatment reactor. A source of carbon 118 may optionally be available to be introduced into third biological treatment reactor 116.

Third biological treatment reactor 116 produces a third biologically treated mixed liquor having a reduced concentration of at least one nutrient. First portion of third biologically treated mixed liquor 224 may be introduced to at least one of wastewater stream 111 and first biological reactor 112. Second portion of third biologically treated mixed liquor 216 may be introduced into further unit operations for additional downstream processing. For example, second portion of third biologically treated mixed liquor 216 may be optionally introduced into aerobic reactor 120 for further biological treatment to produce fourth biologically treated mixed liquor 218 which may be introduced into further unit operations for additional downstream processing. Aerobic reactor 120 may be used to remove nitrogen gas produced in the upstream anoxic reactor from microbial solids to ensure proper settling of the solids in a subsequent clarifier. Aerobic reactor 120 may also nitrify any ammonia produced from an upstream anoxic reactor due to endogenous decay.

Fourth biologically treated mixed liquor 218, or third biologically treated mixed liquor 216 if aerobic reactor 120 is omitted from the process, may be introduced into a separator, such as clarifier 122 to produce treated product or effluent 124, having a reduced concentration of a nutrient which may be suitable for other uses or for discharge, and activated sludge stream 226. Activated sludge stream 226 may be recycled back to source of wastewater 110 or wastewater stream 111. A portion of activated sludge stream 226 may be discharged as waste sludge 130.

In certain examples, treated product or effluent 124 may be monitored for particular characteristics, such as nitrogen content, phosphorus content, total Kjedahl nitrogen (the sum of organic nitrogen, ammonia ($NH_3$), and ammonium ($NH_4^+$)), total nitrogen (the sum of total Kjedahl nitrogen, nitrate, and nitrite), dissolved solids content, chemical oxygen demand, biological demand, or other characteristics. If the level of any one characteristic is not within a desired range or at a desired level, adjustments can be made to the treatment system. For example, if the nitrogen content of treated product differs from a desired level, an adjustment may be made to the flowrate of one or more recycle streams of the system, such as stream 222 or 224.

A controller may facilitate or regulate the operating parameters of the treatment system. For example, controller 126 may be configured to adjust a rate of recycle of one or more streams, such as stream 222, stream 224, or stream 226, an aeration rate in any one of the unit operations of the treatment system, or a dissolved oxygen concentration in a fluid in any one of the unit operations of the system.

The controller may respond to signals from timers or sensors positioned at any particular location within the treatment system. For example, sensor 128 may be positioned to measure a characteristic of the influent wastewater 111 such as a flow rate of the wastewater. Controller 126 may be configured to receive an input signal from sensor 128 and may be further configured to generate an output signal to energize at least one of pump 132 and pump 134, for example, by adjusting the pump speed, and starting or stopping the pump. Controller 126 may energize pump 132 to deliver a portion of second biologically treated mixed liquor to the wastewater stream 111 or first biological reactor 112. Controller 126 may also energize pump 134 to deliver a portion of third biologically treated mixed liquor to the wastewater stream 111 or first biological reactor 112. Pump 132 may deliver a portion of second biologically treated mixed liquor 222 to a first zone of first biological reactor 112, while pump 134 may deliver a portion of third biologically treated mixed liquor 224 to a second or third zone of first biological reactor 112. Controller 126 may also receive input from an operator regarding target setpoints or ranges for parameters of the system. For example, an operator may input percent recycle flow rates for recycle stream 222 and recycle stream 224 based on an influent wastewater stream flow rate. In certain embodiments, the recycle stream flow rates may be in a range of from about 60% to about 200% of the flow rate of the influent wastewater stream. The flow rate of each recycle stream may be the same or different, and may be adjusted continuously or periodically throughout the treatment process.

Existing wastewater treatment facilities may be modified or retrofitted to incorporate one or more various aspects of the systems and techniques disclosed herein, such as the additional recycle stream and the flow-based control to treat wastewater at a reduced cost and reduced energy consumption.

The function and advantage of these and other embodiments of the systems and techniques disclosed herein will be more fully understood from the example below. The following example is intended to illustrate the benefits of the disclosed treatment approach, but do not exemplify the full scope thereof.

EXAMPLE 1

A treatment system such as that disclosed in the present invention was simulated using the BioWin simulator from EnviroSim Associates Ltd. These simulations were performed to demonstrate the effectiveness of the second recycle stream on phosphorus removal, and were not optimized for nitrogen removal. The process as shown in FIG. 1 was simulated, without the optional aerobic bioreactor 120. In the first simulation (SIM1), the process was performed using one recycle stream 222, and without recycle stream 224. In the second simulation (SIM2), the process was performed using two recycle streams, recycle stream 222 and recycle stream 224. The first biological reactor was an aerated anoxic reactor comprising time zones. Recycle stream 222 was introduced into the first zone of the aerated anoxic reactor. Recycle stream 224 was introduced into the third zone of the aerated anoxic reactor. Table 1 lists design input parameters for SIM1 and SIM2.

TABLE 1

Design Input Parameters

| | SIM1 | SIM2 |
|---|---|---|
| Influent Flow | 2.5 MGD | 2.5 MGD |
| MLSS Concentration | 4139 mg/L | 4033 mg/L |
| Anoxic (1) zone 1 volume | 130436 gal | 130436 gal |
| Anoxic (1) zone 2 volume | 130436 gal | 130436 gal |
| Anoxic (1) zone 3 volume | 130436 gal | 130436 gal |
| Aerobic Reactor volume | 750000 gal | 235620 gal |
| Anoxic (2) volume | 360000 gal | 570185 gal |

The simulation was operated to achieve steady state, and calculations were performed by the simulation resulting in values associated with the effluent or treated product stream. Table 2 shows the results of the effluent stream leaving the second anoxic biological reactor of SIM1 and SIM2.

TABLE 2

Results

| | SIM1 - Concentration (mg/L) | SIM2 - Concentration (mg/L) |
|---|---|---|
| Total Phosphorus | 2.85 | 1.65 |
| Total Kjedahl Nitrogen | 3.40 | 3.17 |
| Total Nitrogen | 3.84 | 3.83 |

As can be seen in Table 2, the total phosphorus concentration in the effluent was reduced when the second recycle stream was added to the system. Additionally, the total nitrogen and total Kjedahl nitrogen concentration was reduced when adding the second recycle stream to the system. As demonstrated through this example, the second recycle stream provides significant reduction of nutrients in the effluent stream, and will provide cost savings and energy savings to the wastewater treatment system when compared with conventional systems that use one recycle stream.

What is claimed is:

1. A process for reducing a concentration of a nutrient from a wastewater comprising:
providing a wastewater comprising the nutrient;
treating the wastewater by at least one of anoxically treating and aerated anoxically treating in a first anoxic reactor to produce a first anoxically treated mixed liquor;
aerobically treating the first anoxically treated mixed liquor in an aerobic reactor to produce an aerobically treated mixed liquor;
treating a first portion of the aerobically treated mixed liquor in a second anoxic reactor to produce a second anoxically treated mixed liquor having a reduced concentration of the nutrient;
introducing a second portion of the aerobically treated mixed liquor to at least one of the wastewater and the first anoxic reactor;
introducing a first portion of the second anoxically treated mixed liquor to at least one of the wastewater and the first anoxic reactor; and
adjusting a flowrate of the second portion of the aerobically treated mixed liquor.

2. The process of claim 1, further comprising biologically treating a second portion of the second anoxically treated mixed liquor in a biological reactor to produce a biologically treated mixed liquor.

3. The process of claim 2, further comprising separating the biologically treated mixed liquor in a separator to produce an activated sludge and an effluent stream having a reduced concentration of the nutrient.

4. The process of claim 3, further comprising combining at least a portion of the activated sludge with the wastewater.

5. The process of claim 1, wherein the wastewater is anoxically treated in the first anoxic reactor.

6. The process of claim 1, wherein the wastewater is aerated anoxically treated in the first biological reactor.

7. The process of claim 1, wherein adjusting the flowrate is based on at least one characteristic of the wastewater, the first anoxically treated mixed liquor, the aerobically treated mixed liquor, the second anoxically treated mixed liquor, and the biologically treated mixed liquor.

8. The process of claim 1, wherein introducing the first portion of the second anoxically treated mixed liquor to at least one of the wastewater and the first anoxic reactor comprises adjusting a flowrate of the first portion of the second anoxically treated mixed liquor.

9. The process of claim 8, wherein adjusting the flowrate is based on at least one characteristic of the wastewater, the first anoxically treated mixed liquor, the aerobically treated mixed liquor, the second anoxically treated mixed liquor, and the biologically treated mixed liquor.

10. The process of claim 1, wherein the nutrient is selected from the group consisting of nitrogen, phosphorus, and combinations thereof.

11. A wastewater treatment system for reducing a concentration of a nutrient from a wastewater comprising:
a source of wastewater comprising the nutrient;
one of a first anoxic reactor and an aerated anoxic reactor having an inlet fluidly connected to the source of the wastewater, the one of the first anoxic reactor and the aerated anoxic reactor comprising at least two anoxic zones, wherein a first zone is proximate the inlet and a second zone is proximate an outlet of the one of the first anoxic reactor and the aerated anoxic reactor, and having a lower amount of oxygen supplied to the first zone than the second zone;
an aerobic reactor having an inlet fluidly connected to the one of the first anoxic reactor and the aerated anoxic reactor;
a second anoxic reactor having an inlet fluidly connected to the aerobic reactor, and an outlet to deliver a mixed liquor stream having a reduced concentration of the nutrient;
a first mixed liquor recycle line fluidly connecting an outlet of the aerobic reactor to at least one of the source of wastewater and the first anoxic reactor; and
a second mixed liquor recycle line fluidly connecting an outlet of the second anoxic reactor to at least one of the source of wastewater and the first anoxic reactor.

12. The wastewater treatment system of claim 11, wherein the first biological reactor is an anoxic reactor.

13. The wastewater treatment system of claim 11, wherein the first biological reactor is an aerated anoxic reactor.

14. The wastewater treatment system of claim 11, wherein the first mixed liquor recycle line is fluidly connected to a first zone of the one of the first anoxic reactor and the aerated anoxic reactor, and the second mixed liquor recycle line is fluidly connected to a second zone of the one of the first anoxic reactor and the aerated anoxic reactor.

15. The wastewater treatment system of claim 11, further comprising a biological reactor having an inlet fluidly connected to the second anoxic reactor.

16. The wastewater treatment system of claim 15, further comprising a separator having an inlet fluidly connected downstream of the second anoxic reactor.

17. The wastewater treatment system of claim 16, further comprising an activated sludge recycle line fluidly connected to an outlet of the separator and the source of wastewater.

18. The wastewater treatment system of claim 11, further comprising a controller configured to generate a first output signal that energizes a first pump in the first mixed liquor recycle line.

19. The wastewater treatment system of claim 18, wherein the controller is further configured to generate a second output signal that energizes a second pump in the second mixed liquor recycle line.

20. The wastewater treatment system of claim 19, wherein at least one of the first output signal and the second output signal is based on a measured input signal of at least one of a characteristic of the wastewater and the mixed liquor stream having a reduced concentration of the nutrient.

21. The wastewater treatment system of claim 20, wherein the controller is further configured to generate a third output signal that adjusts at least one aeration system in at least one of the one of the first anoxic reactor and the aerated anoxic reactor, the aerobic reactor, the second anoxic reactor, and the biological reactor.

22. The system of claim 11, wherein the nutrient is selected from the group consisting of nitrogen and phosphorus.

23. A method of facilitating wastewater treatment in a wastewater treatment system for reducing a concentration of a nutrient from a wastewater having a source of wastewater, one of a first anoxic reactor and an aerated anoxic reactor, an aerobic reactor, a second anoxic reactor, and a recycle stream fluidly connecting an outlet of the aerobic reactor to at least one of the source of wastewater and the first biological reactor, the method comprising:
fluidly connecting an outlet of the second anoxic reactor to at least one of the source of wastewater and the one of the first anoxic reactor and the aerated anoxic reactor; and adjusting a flowrate of the recycle stream fluidly connecting an outlet of the aerobic reactor to at least one of the source of the wastewater and the one of the first anoxic reactor and the aerated anoxic reactor.

24. The method of claim 23, further comprising providing a controller configured to energize a first pump that is disposed to deliver a first biologically treated mixed liquor from the aerobic reactor to at least one of the source wastewater and the one of the first anoxic reactor and an aerated anoxic reactor, and further configured to energize a second pump that is disposed to deliver a second biologically treated mixed liquor from the second anoxic reactor to at least one of the source of wastewater and the one of the first anoxic reactor and an aerated anoxic reactor.

25. The method of claim 24, wherein at least one of the first pump and the second pump is energized based on a characteristic of a stream of the wastewater treatment system.

26. The method of claim 25, wherein the characteristic is selected from the group consisting of nitrogen concentration, phosphorus concentration, temperature, pressure, flowrate, pH, dissolved oxygen concentration, biological oxygen demand, chemical oxygen demand, oxygen uptake ratio, viscosity, and combinations thereof.

27. The method of claim 23, wherein the nutrient is selected from the group consisting of nitrogen, phosphorus, and combinations thereof.

* * * * *